United States Patent [19]
McKinney et al.

[11] Patent Number: 5,527,098
[45] Date of Patent: Jun. 18, 1996

[54] TAILGATE FOR A RECYCLABLE MATERIAL CONTAINER MOUNTED ON A VEHICLE CHASSIS

[75] Inventors: Bobby R. McKinney, Fort Payne, Ala.; Jerald G. Zanzig, Signal Mountain; Norman J. Glomski, Chattanooga, both of Tenn.

[73] Assignee: The Heil Company, Chattanooga, Tenn.

[21] Appl. No.: 367,706

[22] Filed: Jan. 3, 1995

[51] Int. Cl.⁶ .................................................. B65F 03/14
[52] U.S. Cl. ..................... 298/23 MD; 296/56; 298/8 R
[58] Field of Search ................. 296/51, 56; 298/23 MD, 298/23 S, 8 H, 8 R; 105/375; 414/512, 520

[56] References Cited

U.S. PATENT DOCUMENTS

| | | |
|---|---|---|
| 159,211 | 1/1875 | Patton et al. |
| 779,804 | 1/1905 | Rodenhausen . |
| 1,425,821 | 8/1922 | Anthony . |
| 1,566,540 | 12/1925 | Ketcham . |
| 1,624,376 | 4/1927 | Venable . |
| 1,650,249 | 11/1927 | Venable . |
| 1,820,910 | 9/1931 | Harm . |
| 1,952,986 | 3/1934 | Horton . |
| 2,212,058 | 8/1940 | Wood ................................ 298/23 MD |
| 3,552,659 | 1/1971 | Meyer . |
| 3,693,693 | 9/1972 | Court ..................................... 296/51 X |
| 4,067,466 | 1/1978 | Parks et al. ............................ 296/51 X |
| 4,372,726 | 2/1983 | Lutz ......................................... 414/517 |
| 4,557,658 | 12/1985 | Lutz ......................................... 414/517 |
| 4,666,211 | 5/1987 | Smith et al. ............................ 298/8 R |
| 5,035,564 | 7/1991 | Matsumoto .............................. 414/409 |
| 5,078,567 | 1/1992 | Lombardo ............................. 414/525.6 |
| 5,288,196 | 2/1994 | Horning et al. ......................... 414/407 |
| 5,316,430 | 5/1994 | Horning et al. ......................... 414/407 |

FOREIGN PATENT DOCUMENTS

| 3537546 | 4/1987 | Germany . |
|---|---|---|

*Primary Examiner*—Frank E. Werner
*Assistant Examiner*—Janice L. Krizek
*Attorney, Agent, or Firm*—McAndrews, Held, & Malloy, Ltd.

[57] ABSTRACT

An improved tailgate for a recyclable material container mounted on a vehicle chassis includes an upper door normally closing an upper compartment opening and a lower door normally closing a lower compartment opening. The upper door is pivotally connected at an upper portion thereof to an upper portion of the container. The lower door has a pair of support arms extending upwardly therefrom, each of which is movably connected at its upper portion to an upper portion of the container. The upper and lower doors each further includes a lifting mechanism for translating the respective door from a normally closed to an open position.

5 Claims, 3 Drawing Sheets

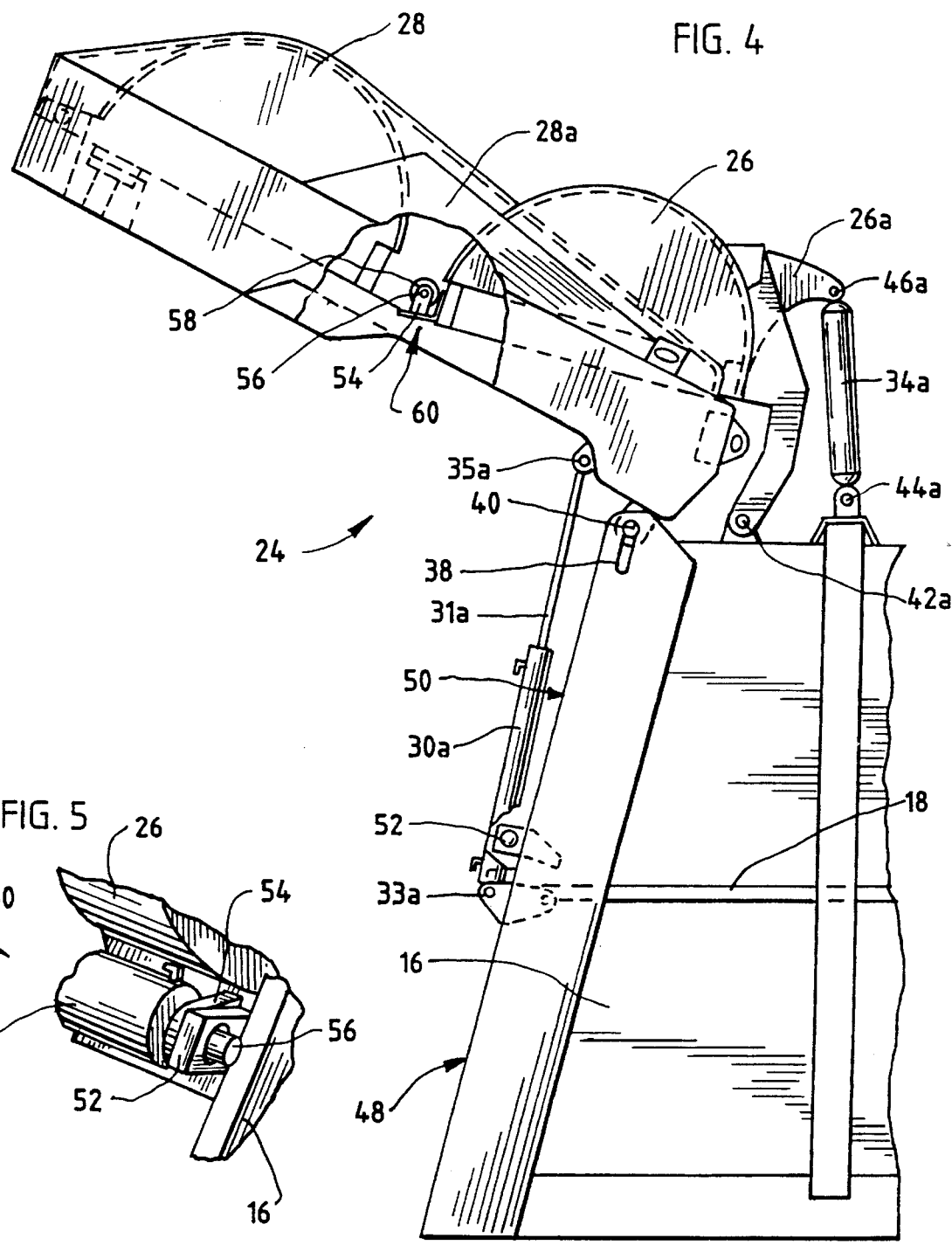

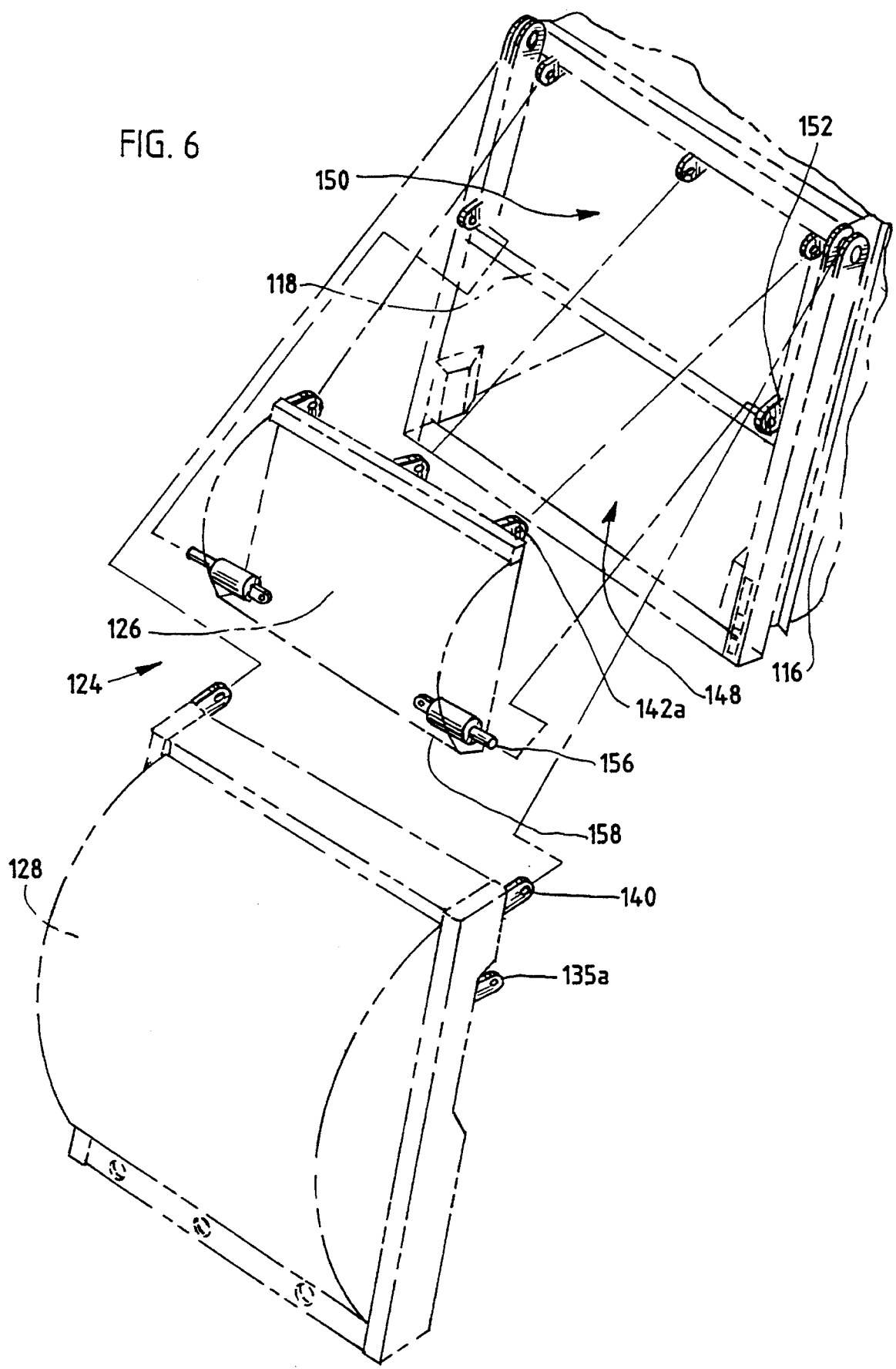

TAILGATE FOR A RECYCLABLE MATERIAL CONTAINER MOUNTED ON A VEHICLE CHASSIS

FIELD OF THE INVENTION

The present invention vehicles for collecting, transporting and delivering recyclable materials, and in particular, to a tailgate for a recyclable material container mounted on a vehicle chassis. The container includes a tailgate for providing access to the interior of each of two or more compartments for separately receiving, storing and discharging different types of recyclable materials.

BACKGROUND OF THE INVENTION

Conventional refuse collection vehicles are generally unsuitable for collecting, transporting and delivering recyclable materials. Conventional refuse collection vehicles typically contain a single compartment into which all of the collected waste materials are deposited and retained while being transported to a central waste disposal facility. When collecting and transporting recyclable materials, it is generally desirable to maintain different materials in separate compartments in view of the requirements of most recycling facilities that certain materials be segregated from others. For example, recycling facilities often permit the commingling of aluminum, glass and plastic recyclable materials, but require the segregation of paper and newsprint from the commingled aluminum, glass and plastic. In this regard, recycling facilities generally pay considerably less for paper and newsprint that has been commingled and contaminated with even a residual amount of aluminum, glass or plastic materials. Conversely, recycling facilities generally pay substantially more for paper and newsprint that is free from residual amounts of aluminum, glass and plastic.

Vehicles have been specifically designed for the collection, transporting and delivery of recyclable materials in which multiple compartments are each designed to contain a specific type of recyclable material. For example, U.S. Pat. No. 5,316,430 discloses a recyclable material collection vehicle having multiple compartments for collecting and retaining different types of recyclable materials. FIG. 14 of the '430 patent shows a vehicle having an upper and a lower compartment for collecting and retaining two different types of recyclable materials. Each of the upper and lower compartments has a rear discharge door. In order to discharge the contents of the upper compartment, an upper rear discharge door is released and the vehicle body is raised via actuators. As the vehicle body is raised, the contents of the upper compartment are discharged through the door. Similarly, to discharge the contents of the lower compartment, the lower rear door is released and the vehicle body is raised.

In transporting and delivering recyclable materials, it has been found advantageous to place paper and newsprint in the lowermost portion of the container. Paper and newsprint are among the most dense of recyclable materials, and their placement in the lower compartment of the vehicle container promotes vehicle stability, especially when the vehicle makes turns.

SUMMARY OF THE INVENTION

An improved tailgate is provided for a recyclable material container. The container is mountable on a vehicle chassis and extends longitudinally between a forward end and a rearward end. The container encloses a material receiving volume, and includes a horizontal wall within the volume for dividing the volume into separate upper and lower material receiving compartments. Each compartment has a material discharge opening at the rearward end of the container. The improved tailgate comprises:

(a) an upper door normally closing the upper compartment opening, the upper door being movably connected at an upper portion thereof to an upper portion of the container, the upper door further comprising a lifting mechanism for translating the upper door from a normally closed to an open position; and (b) a lower door normally closing the lower compartment opening, the lower door having a pair of support arms extending upwardly therefrom, each of the support arms movably connected at its upper portion to an upper portion of the container, the lower door further comprising a lifting mechanism for translating the lower door from a normally closed to an open position.

In the preferred tailgate, the upper door lifting mechanism comprises a pair of oppositely disposed slide cylinders. Each of the slide cylinders has an actuating rod projecting therefrom. The slide cylinders are pivotally connected at one end to an upper portion of the upper door and pivotally connected at the other end to an upper portion of the container.

In the more preferred tailgate, the upper door has a pair of support arms extending upwardly therefrom and one end of each of the slide cylinders is pivotally connected to one of the upper door support arms.

The preferred lower door lifting mechanism comprises a pair of oppositely disposed slide cylinders. Each of the slide cylinders has an actuating rod projecting therefrom. The slide cylinders are pivotally connected at one end to an upper portion of the lower door support arms and pivotally connected at the other end to a portion of the container approximately midway between the upper and lower compartments.

Another embodiment of the improved tailgate comprises:

(a) an inner door normally closing the upper compartment opening, the inner door being movably connected at an upper portion thereof to an upper portion of the container, the inner door further comprising a lifting mechanism for translating the inner door from a normally closed to an open position; and (b) an outer door normally closing both of the upper and lower compartment openings, the outer door being movably connected at its upper portion to an upper portion of the container, the outer door further comprising a lifting mechanism for translating the outer door from a normally closed to an open position.

BRIEF DESCRIPTION OF THE DRAWINGS

FIG. 4 is a side elevation view of the tailgate portion of the recyclable material collection vehicle of FIG. 1, showing the upper door and the lower door both in the fully opened position.

FIG. 5 is a perspective view of the upper door locking mechanism.

FIG. 6 is an exploded perspective view of another embodiment of an improved recyclable material collection vehicle tailgate.

DETAILED DESCRIPTION OF THE PREFERRED EMBODIMENTS

Figure 1:
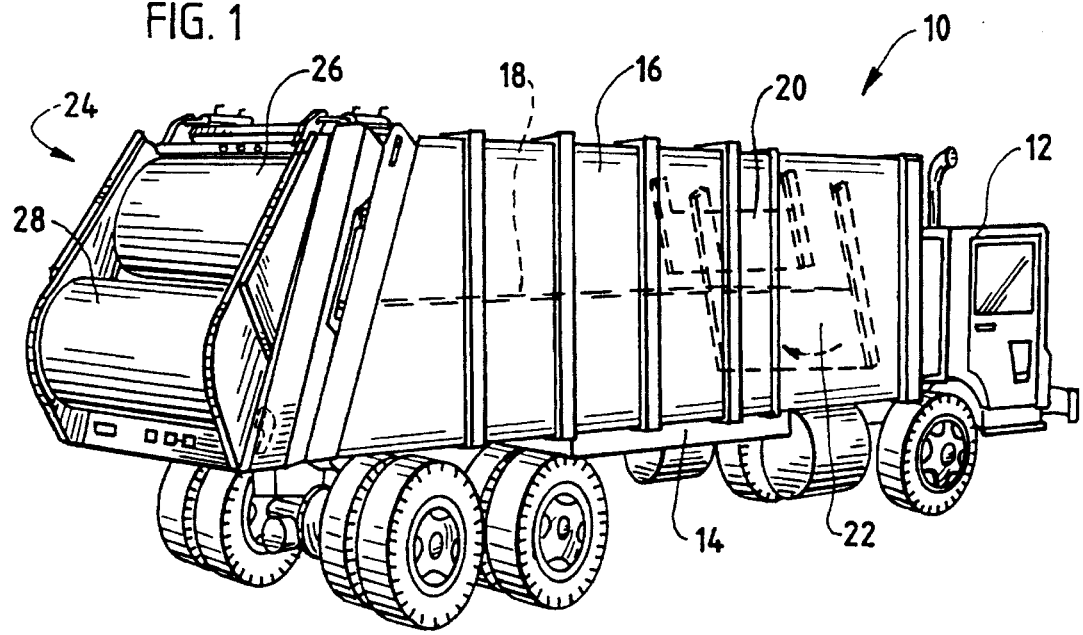
FIG. 1 is a perspective view of a recyclable material collection vehicle having an improved tailgate with upper and lower doors for providing access to the interior of each of two recyclable material compartments.

Turning first to FIG. 1, a recyclable material collection vehicle 10 includes a cab 12, a vehicle chassis 14, and a recyclable material container 16 mounted on chassis 14. Container 16 extends longitudinally between a forward end adjacent cab 12 and a rearward end which terminates at a tailgate 24. Container 16 encloses a material receiving interior volume and includes a horizontal wall 18 for dividing the interior volume into separate upper and lower material receiving compartments.

Recyclable materials are deposited into each of the upper and lower compartments via separate openings (not shown) in the roof of container 16. Packer panels 20, 22 periodically compress the recyclable material contained within each of the upper and lower compartments, respectively. In use, paper and newsprint are preferably deposited in the lower compartment of container 16, while aluminum, glass and plastic are preferably deposited in the upper compartment of container 16.

Each of the upper and lower compartments of container 16 has a material discharge opening at the rearward end of the container adjacent tailgate 24. An upper door 26, shown in the normally closed position in FIG. 1, covers the discharge opening of the upper compartment. A lower door 28, also shown in the normally closed position in FIG. 1, covers the discharge opening of the lower compartment.

Figure 2:
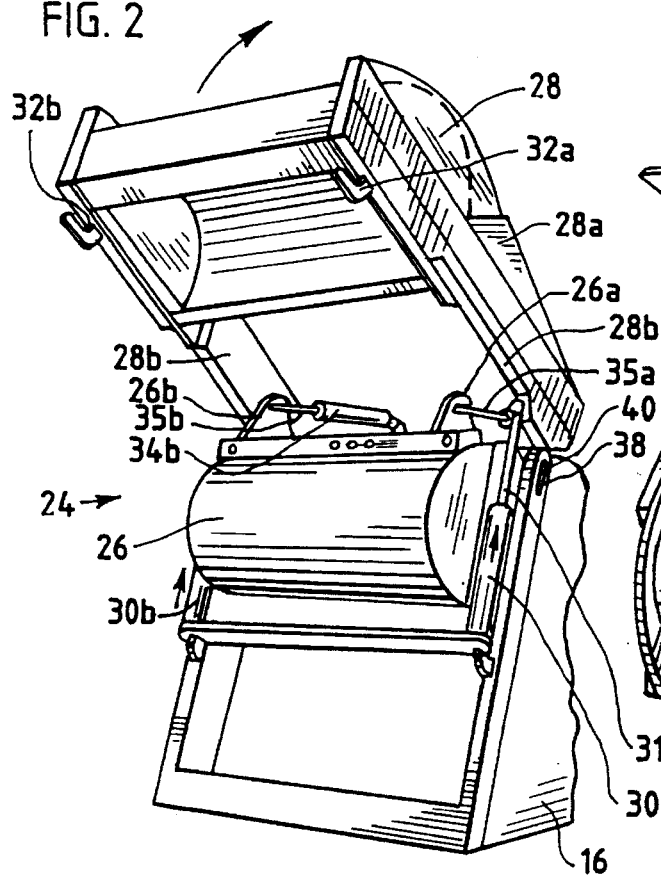
FIG. 2 is a perspective view of the tailgate portion of the recyclable material collection vehicle of FIG. 1, showing the lower door in the fully opened position and the upper door in the closed position.
Figure 3:
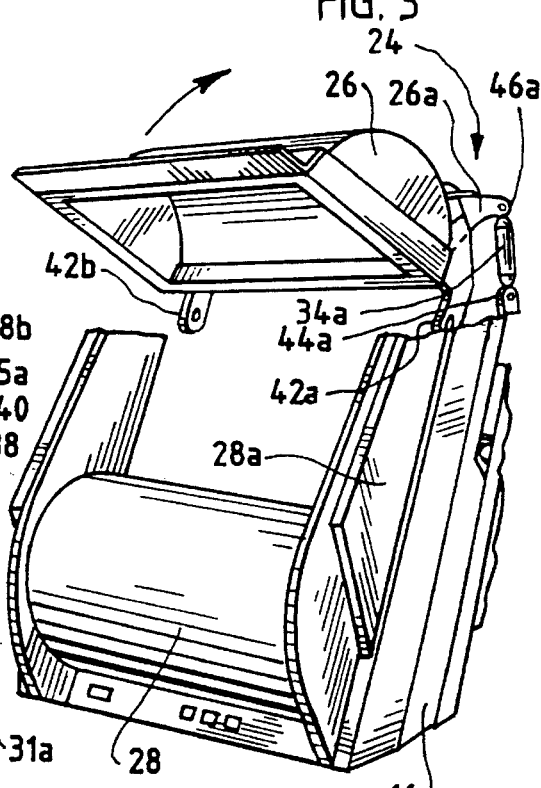
FIG. 3 is a perspective view of the tailgate portion of the recyclable material collection vehicle of FIG. 1, showing the upper door in the fully opened position and the lower door in the closed position.

Turning now to FIG. 2, tailgate 24 of the recyclable material collection vehicle is shown with lower door 28 in the fully opened position and upper door 26 in the closed position. FIG. 3 shows tailgate 24 with upper door 26 in the fully opened position and lower door 28 in the closed position.

As shown in FIG. 2, lower door 28 has a pair of support arms 28a, 28b extending upwardly therefrom. Each of support arms 28a, 28b is pivotally connected at its upper portion by pivot pins, one of which is shown in FIG. 2 as pivot pin 40, within a slot 38 formed in an upper portion of container 16.

A lifting mechanism, shown in FIG. 2 as a pair of oppositely disposed slide cylinders 30a, 30b, translates lower door 28 from a normally closed position (shown in FIG. 1) to an open position shown in FIG. 2. Each of the slide cylinders has an actuating rod projecting therefrom, one of which is shown in FIG. 2 as actuating rod 31a. Actuating rod 31b of slide cylinder 30a is pivotally connected at its upper end to an upper portion of the lower door support arm 28a. Slide cylinder 30a is pivotally connected at its lower end to a portion of container 16 approximately midway between the upper and lower compartments, as shown in FIG. 2. Extension of actuating rod 31a from slide cylinder 30a translates the lower door from a normally closed to the open position shown in FIG. 2.

A pair of oppositely disposed hook members 32a, 32b extend downwardly from lower door 28 for insertion into corresponding openings in container 16 to retain lower door 28 in the normally closed position when actuating rod 31a is retracted into slide cylinder 30a.

As shown in FIG. 3, upper door 26 is pivotally connected at pivot pins 42a, 42b to an upper portion of container 16. Upper door 26 preferably has a pair of support arms 26a, 26b extending upwardly therefrom, as shown in FIG. 2. A lifting mechanism, shown in FIGS. 2 and 3 as a pair of oppositely disposed pivot cylinders 34a, 34b, translates upper door 26 from a normally closed position (shown in FIG. 1) to an open position shown in FIG. 3. Each of pivot cylinders 34a, 34b has an actuating rod 35a, 35b projecting therefrom (shown in FIG. 2). The upper ends of actuating rods 35a, 35b extending from pivot cylinders 34a, 34b, respectively, are pivotally connected to upper door support arm 26a, 26b at pivot pins, one of which is designated in FIG. 3 as pivot pin 46a. The lower ends of pivot cylinders 34a, 34b are pivotally connected to an upper portion of container 16 at pivot pins, one of which is designated in FIG. 3 as pivot pin 44a. Retraction of actuating rods 35a, 35b into pivot cylinders 34a, 34b, respectively, translates the upper door from a normally closed position to the open position shown in FIG. 3.

FIG. 4 shows a side view of tailgate 24 with upper door 26 and lower door 28 both in the fully opened position. As shown in FIG. 4, container 16 includes horizontal wall 18 for dividing the interior volume into separate upper and lower material receiving compartments. The upper compartment has a material discharge opening 50 at the rearward end of container 16 adjacent tailgate 24, and the lower compartment has a material discharge opening 48 at the rearward end of container 16 adjacent tailgate 24.

As shown in FIG. 4, support arm 28a extending upwardly from lower door 28 is pivotally connected at its upper portion by a pivot pin 40 slidably held within a slot 38 formed in an upper portion of container 16. Slide cylinder 30a translates lower door 28 from a normally closed position to the open position shown in FIG. 4. Slide cylinder 30a has an actuating rod 31a projecting therefrom. Actuating rod 31a is pivotally connected at its upper end to an upper portion of the lower door support arm 28a. Slide cylinder 30a is pivotally connected at its lower end by pivot pin 33a to a portion of container 16 approximately midway between the upper and lower compartments, as shown in FIG. 4. Extension of actuating rod 31a from slide cylinder 30a translates the lower door from a normally closed to the open position shown in FIG. 4.

As shown in FIG. 4, upper door 26 is pivotally connected at pivot pin 42a to an upper portion of container 16. A pair of support arms 26a, 26b extend from upper door 26, as shown in FIG. 4. Pivot cylinder 34a translates upper door 26 from a normally closed position to the open position shown in FIG. 4. The upper end of the actuating rod (not shown) of pivot cylinder 34a is pivotally connected to upper door support arm 26a at pivot pin 46a, as shown in FIG. 4. The lower end of pivot cylinder 34a is pivotally connected to an upper portion of container 16 at pivot pin 44a. Retraction of the actuating rod (not shown) of pivot cylinder 34a translates the upper door from a normally closed to the open position shown in FIG. 4.

A locking mechanism 60 for upper door 26 is shown in FIG. 5, and partially in FIG. 4. Locking mechanism 60 includes a lock cylinder 58 and support flange 54, both of which are attached to upper door 26. An actuating rod 56 extends from lock cylinder 58 and through the opening in support flange 54. A corresponding locking flange 52 is attached to and extends from container 16. When upper door 26 is in the closed position, as shown in FIG. 5, extension of actuating rod 56 from lock cylinder 58 into the opening of locking flange 52 retains upper door 26 in the closed position.

FIG. 6 shows another embodiment of a recyclable material collection vehicle tailgate. Tailgate 124 is located at the rearward end of a container 116, which is in turn mountable on a vehicle chassis, in a manner similar to the mounting of container 16 on vehicle chassis 14 in FIG. 1. Container 116 encloses a material receiving interior volume and includes a horizontal wall 118 for dividing the interior volume into separate upper and lower material receiving compartments. Each of the upper and lower compartments has a material discharge opening 150, 148, respectively, at the rearward end of container 116.

As shown in FIG. 6, tailgate 124 includes an inner door 126 normally closing upper compartment opening 150 and an outer door 128 normally closing both of the upper and lower compartment openings 150, 148. Outer door 128 is pivotally connected at two pivot flanges, one of which is designated in FIG. 6 as pivot flange 140 located on an upper portion of outer door 128, to an upper portion of container 116. Outer door 128 also includes a lifting mechanism for pivotally translating outer door 128 from a normally closed to an open position. The preferred lifting mechanism is the slide cylinder arrangement illustrated and described with respect to lower door 28 in FIGS. 2–4. In the preferred embodiment, the upper end of the slide cylinder is pivotally connected to outer door 128 at pivot flange 135a, as shown in FIG. 6.

Inner door 126 is pivotally connected at three pivot flanges, one of which is designated in FIG. 6 as pivot flange 142a located on an upper portion of inner door 126, to an upper portion of container 116. Inner door 126 also includes a lifting mechanism (not shown in FIG. 6) for translating inner door 126 from a normally closed position to an open position. The preferred lifting mechanism is a spring or plurality of springs that extend between outer door 128 and inner door 126 such that when outer door 128 is opened and the inner door locking mechanism (explained below) is deactivated, inner door 126 is translated from a normally closed position to an open position.

The locking mechanism for inner door 126 is also shown in FIG. 6. The locking mechanism includes a pair of oppositely disposed slide cylinders, one of which is designated in FIG. 6 as lock cylinder 158, attached to inner door 126. An actuating rod 156 extends from lock cylinder 158. A corresponding locking flange 152 is attached to and extends from container 116. When upper door 126 is in the closed position, extension of actuating rod 156 from lock cylinder 158 into the opening of locking flange 152 retains upper door 126 in the closed position.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A tailgate for a material collection container mountable on a vehicle chassis and extending longitudinally between a forward end and a rearward end, the container enclosing a material receiving volume, the container comprising a horizontal wall within the volume for dividing the volume into separate upper and lower material receiving compartments, each compartment having a material discharge opening at the rearward end of the container, the tailgate comprising:

(a) an upper door normally closing the upper compartment opening, said upper door movably connected at an upper portion thereof to an upper portion of the container, said upper door further comprising a lifting mechanism for translating said upper door from a normally closed to an open position; and (b) a lower door normally closing the lower compartment opening, said lower door having a pair of support arms extending upwardly therefrom, each of said support arms movably connected at an upper portion to an upper portion of the container, said lower door further comprising a lifting mechanism for translating said lower door from a normally closed to an open position.

2. The tailgate of claim 1 wherein said upper door lifting mechanism comprises a pair of oppositely disposed slide cylinders, each of said slide cylinders having an actuating rod projecting therefrom, said slide cylinders pivotally connected at one end to an upper portion of said upper door and pivotally connected at the other end to an upper portion of the container.

3. The tailgate of claim 2 wherein said upper door has a pair of support arms extending upwardly therefrom and wherein said one end of each of said slide cylinders is pivotally connected to a respective one of said upper door support arms.

4. The tailgate of claim 1 wherein said lower door lifting mechanism comprises a pair of oppositely disposed slide cylinders, each of said slide cylinders having an actuating rod projecting therefrom, said slide cylinders pivotally connected at one end to an upper portion of said lower door support arms and pivotally connected at the other end to a portion of the container approximately midway between said upper and lower compartments.

5. A tailgate for a material collection container mountable on a vehicle chassis and extending longitudinally between a forward end and a rearward end, the container enclosing a material receiving volume, the container comprising a horizontal wall within the volume for dividing the volume into separate upper and lower material receiving compartments, each of the compartments having a material discharge opening at the rearward end of the container, the tailgate comprising:

(a) an inner door normally closing the upper compartment opening, said inner door movably connected at an upper portion thereof to an upper portion of the container, said inner door further comprising a lifting mechanism for translating said inner door from a normally closed to an open position; and (b) an outer door normally closing both of the upper and lower compartment openings, said outer door movably connected at its upper portion to an upper portion of the container, said outer door further comprising a lifting mechanism for translating said outer door from a normally closed to an open position.

* * * * *